(No Model.)

C. A. GAY.
BICYCLE LOCK.

No. 574,410. Patented Jan. 5, 1897.

Witnesses:
Herbert Bradley
Geo. E. Cruse

Inventor:
Charles Agustus Gay.
By Knight Bros.
Attorneys.

UNITED STATES PATENT OFFICE.

CHARLES A. GAY, OF SEATTLE, WASHINGTON, ASSIGNOR OF ONE-HALF TO JOHN D. ATKINSON AND CHARLES E. REMSBERG, OF SAME PLACE.

BICYCLE-LOCK.

SPECIFICATION forming part of Letters Patent No. 574,410, dated January 5, 1897.

Application filed January 27, 1896. Renewed November 17, 1896. Serial No. 612,526. (No model.)

*To all whom it may concern:*

Be it known that I, CHARLES A. GAY, a citizen of the United States, residing at Seattle, in the county of King and State of Washington, have invented certain new and useful Improvements in Bicycle-Locks, of which the following is a specification.

My invention relates to an improvement in bicycle-locks which are adapted to be secured to the bicycle-frame and when in use to be locked against the rim or tire of one of the wheels.

My invention consists, essentially, of a suitable clamp for attaching the device to the bicycle, a frame carried by the clamp, and the lock having a shoe and secured to the frame so as to turn thereon and bring the shoe to bear upon the rim of the wheel.

In order that my invention may be fully understood, I will proceed to describe the same with reference to the accompanying drawings, in which—

Figure 1:
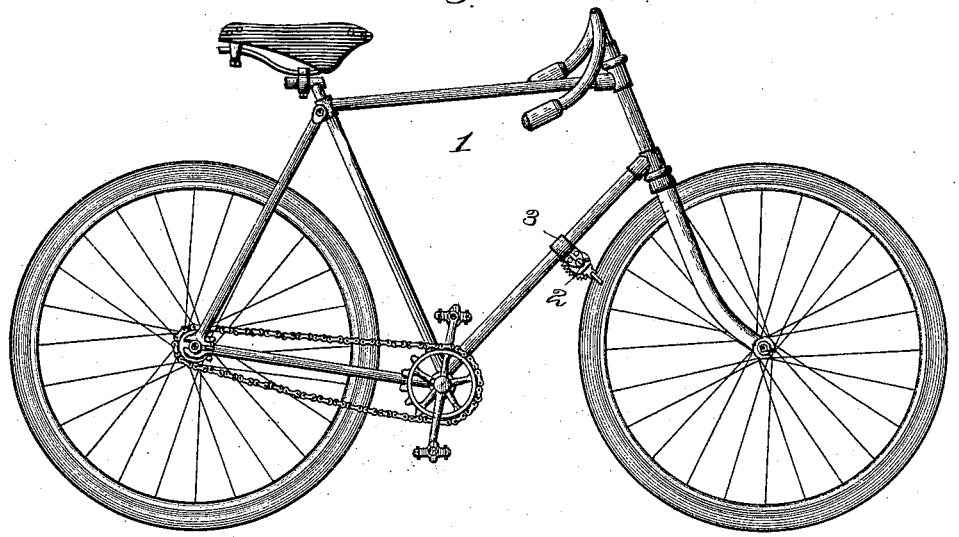
Figure 2:
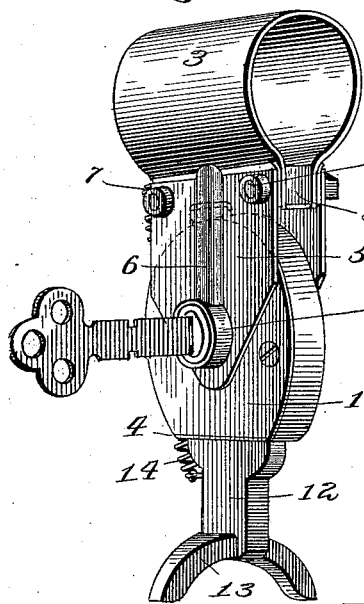
Figure 4:
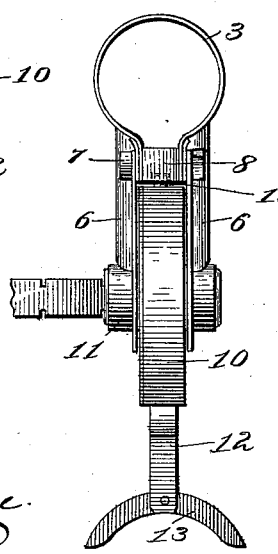
Figure 3:
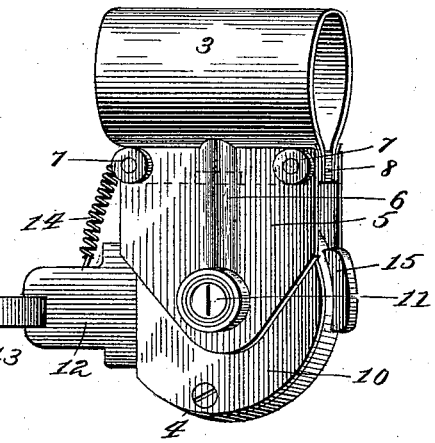

Figure 1 is a side elevation of a bicycle, showing my device applied thereto. Fig. 2 is a perspective view on a larger scale and showing the device in locked position. Fig. 3 is a side elevation showing the device in unlocked position, and Fig. 4 is an edge view.

In the said drawings, 1 represents a bicycle having my device 2 attached to one of the bars of the frame. The device is secured to the frame by means of the clamp 3, and is composed of the lock 4 and the bracket or frame 5, which also serves as a partial casing for the lock. The frame 5 is provided with a stiffening-brace 6 on each side thereof, and it is secured to the clamp 3 by means of the bolts 7.

8 represents a bar placed between the ends of the clamp, and secured therein by the bolts 7. This bar, besides forming a brace for the clamp and frame at this point, also serves as a keeper for the bolt 9 of the lock 4, as shown in dotted lines, Figs. 2 and 4.

The lock 4 is of any desired construction, but is preferably of the form shown in the drawings. This lock, as will be seen, has a casing 10, which is secured in the frame 5 so as to be turned therein, and containing the tumbler mechanism, and a key-plug 11, by which the casing 10 is turned so as to throw the device into locked position and the bolt 15 into the keeper.

12 represents a leg or projection extending down from the casing 10, and it has secured thereon a shoe 13.

14 represents a spring for bringing the lock to the position shown in Fig. 3, having one end secured to the projection 12 and the other end to the bar 8.

The operation of my device is as follows: The device is secured on the frame of the bicycle so as to bear upon either wheel, and the parts are normally in the position shown in Fig. 3. When it is desired to lock the wheel, the key of the lock is inserted in the key-plug for assembling the tumblers to allow the bolt to be withdrawn, and the turning of the plug throws the device into the position shown in Fig. 2. The key is then withdrawn and the bolt allowed to move into the keeper.

It will be understood that the device is secured on the frame in such a position that when the shoe is being applied it will have to be forced somewhat, owing to the shoe coming against the tire before it reaches its vertical position, and when forced to its vertical position it will be indented in the periphery of the tire, and in this manner form a very effective lock.

Having thus fully described my invention, the following is what I claim as new therein and desire to secure by Letters Patent:

1. In a bicycle-lock, the combination of a suitable clamp for attaching the lock to a bicycle, a frame secured to said clamp, a lock secured in said frame and adapted to be turned therein, a bar or keeper for said lock secured in the frame, and a shoe carried by the lock and adapted to bear upon the bicycle-wheel, substantially as shown and described.

2. The combination in a brake attachment for bicycles, a suitable clamp for securing the device to the bicycle, a frame carried by said clamp, a lock carried by said frame and adapted to be turned therein, a keeper for said lock also carried by the frame, a shoe carried by the lock, and a spring having one end secured to the shoe and the other end to the keeper, substantially as shown and described.

CHARLES A. GAY.

Witnesses:
DAVID A. GAILEY,
M. W. LOVEJOY.